June 18, 1929.  R. SÉNÉ  1,718,085
MOVABLE PLATFORM
Filed June 27, 1928   8 Sheets-Sheet 4
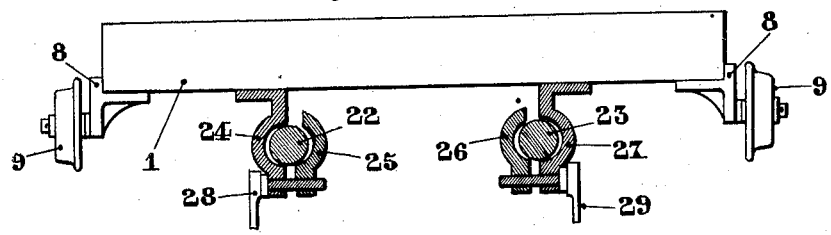
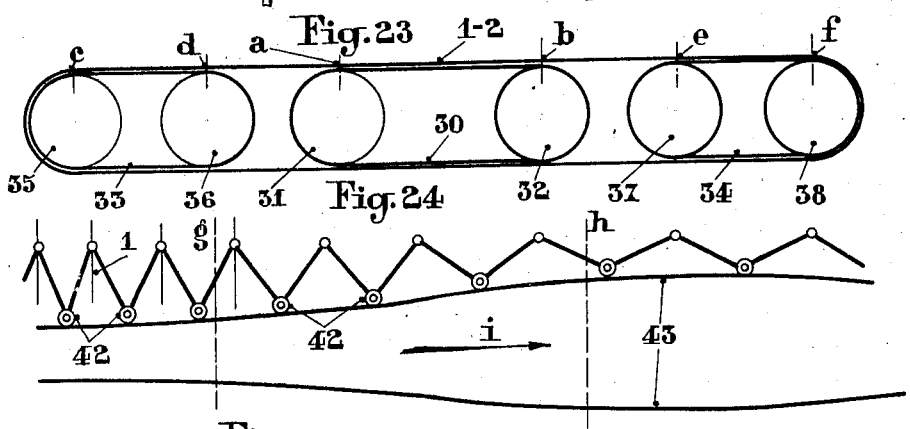
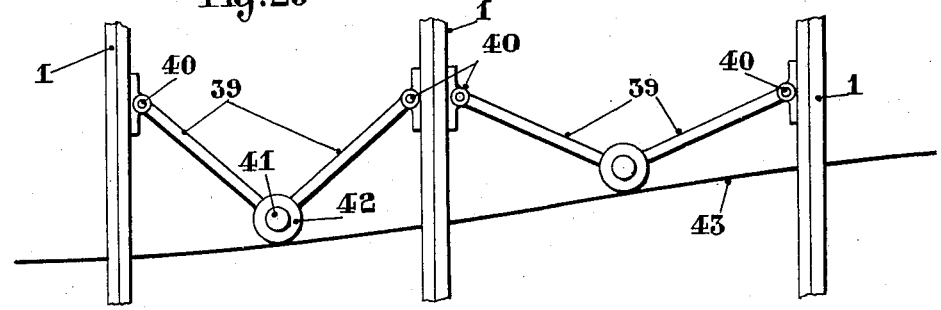
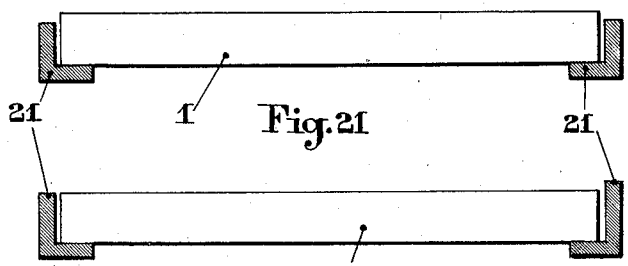

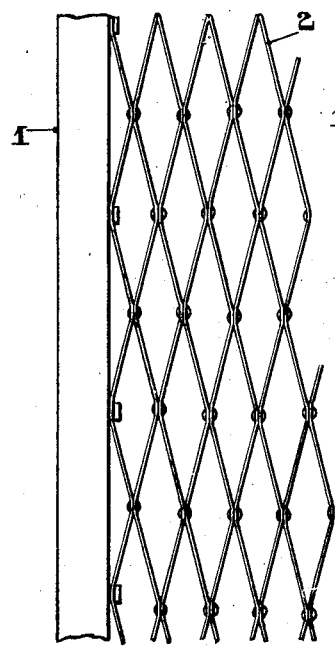
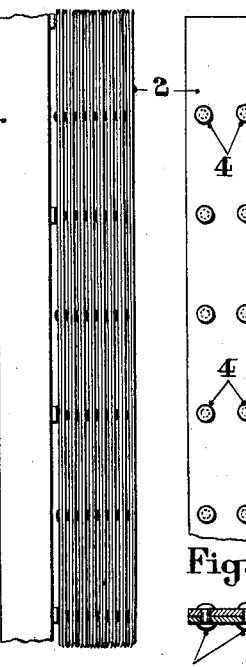
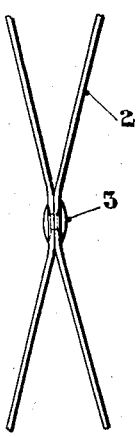
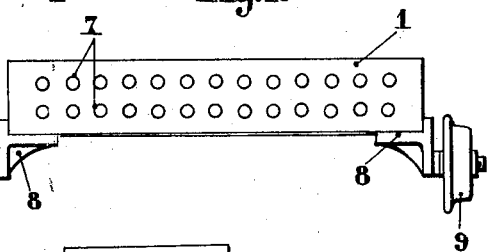
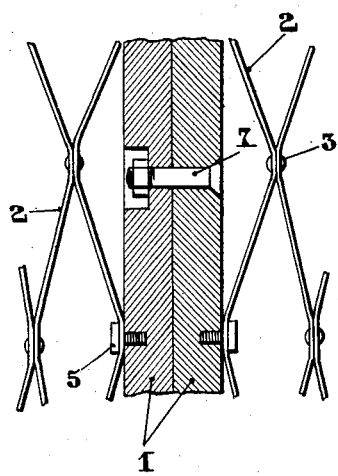
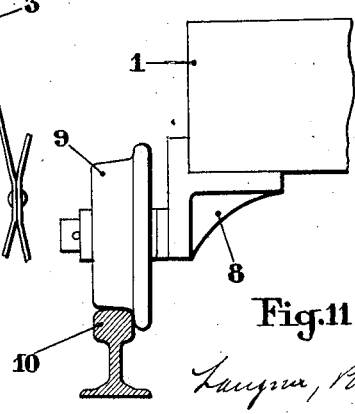

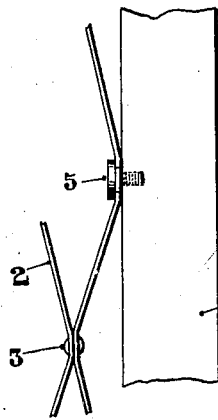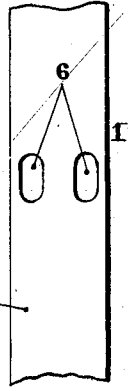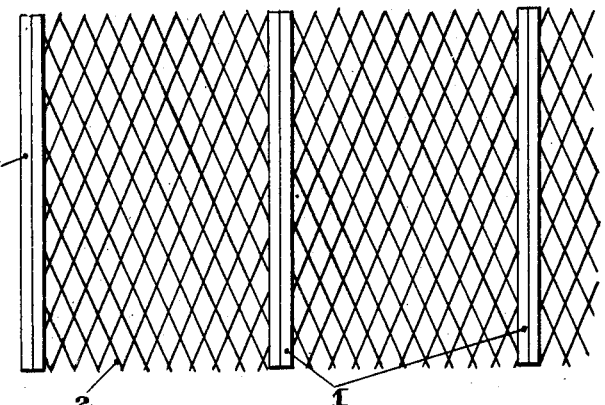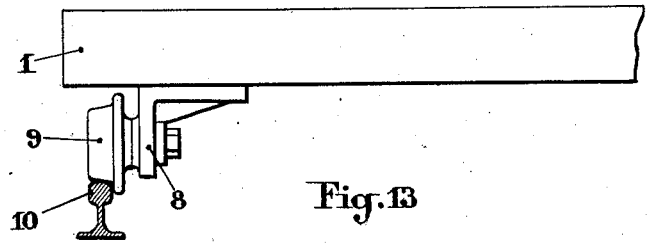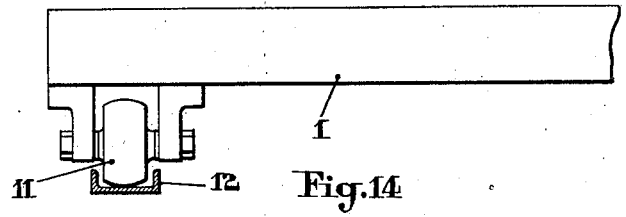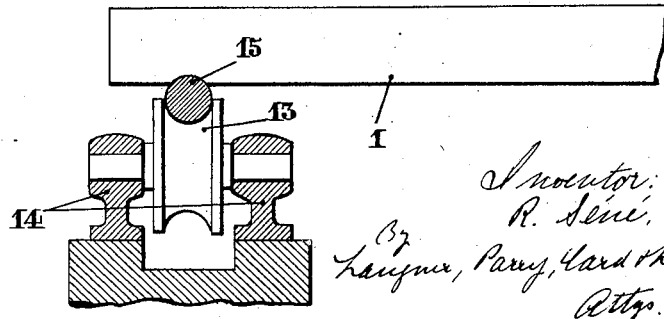

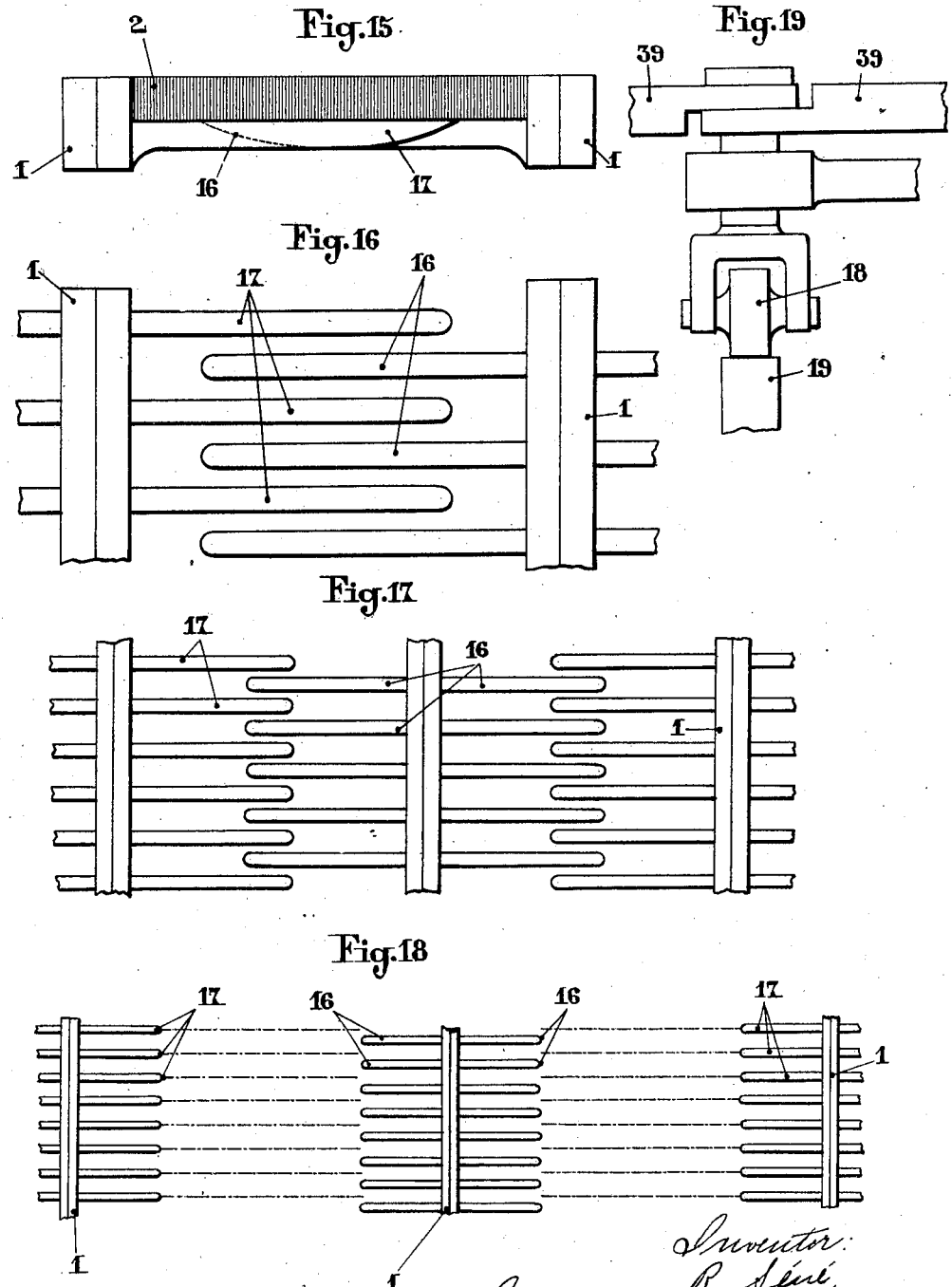

June 18, 1929.   R. SÉNÉ   1,718,085
MOVABLE PLATFORM
Filed June 27, 1928   8 Sheets-Sheet 5
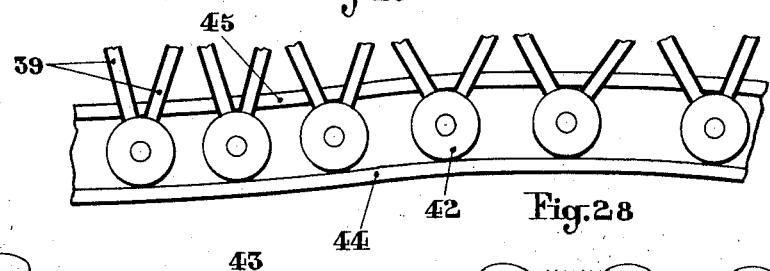
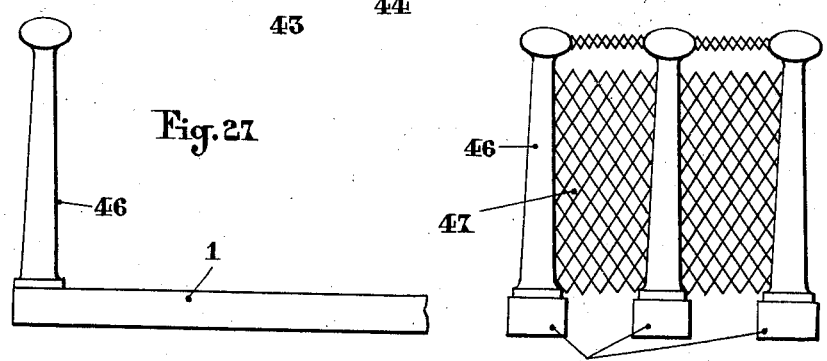
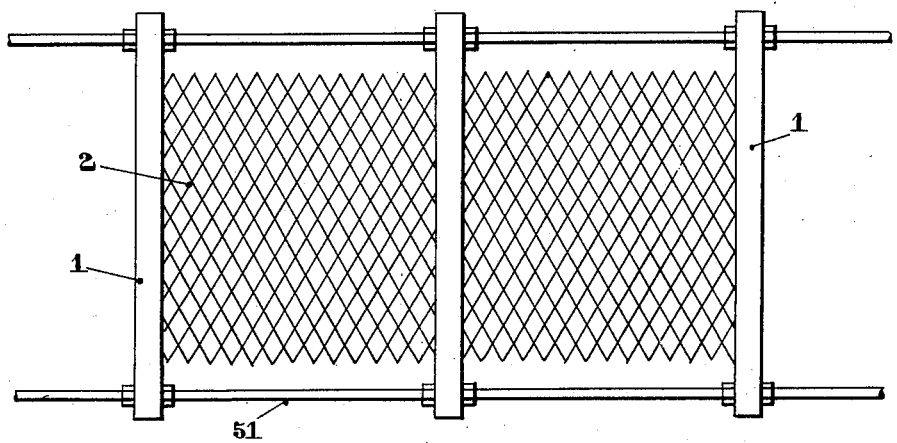
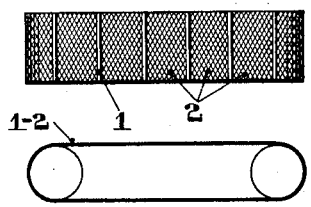

June 18, 1929.  R. SÉNÉ  1,718,085

MOVABLE PLATFORM

Filed June 27, 1928   8 Sheets-Sheet 6

Inventor:
R. Séné
By Langner, Parry, Card & Langner
Attys.

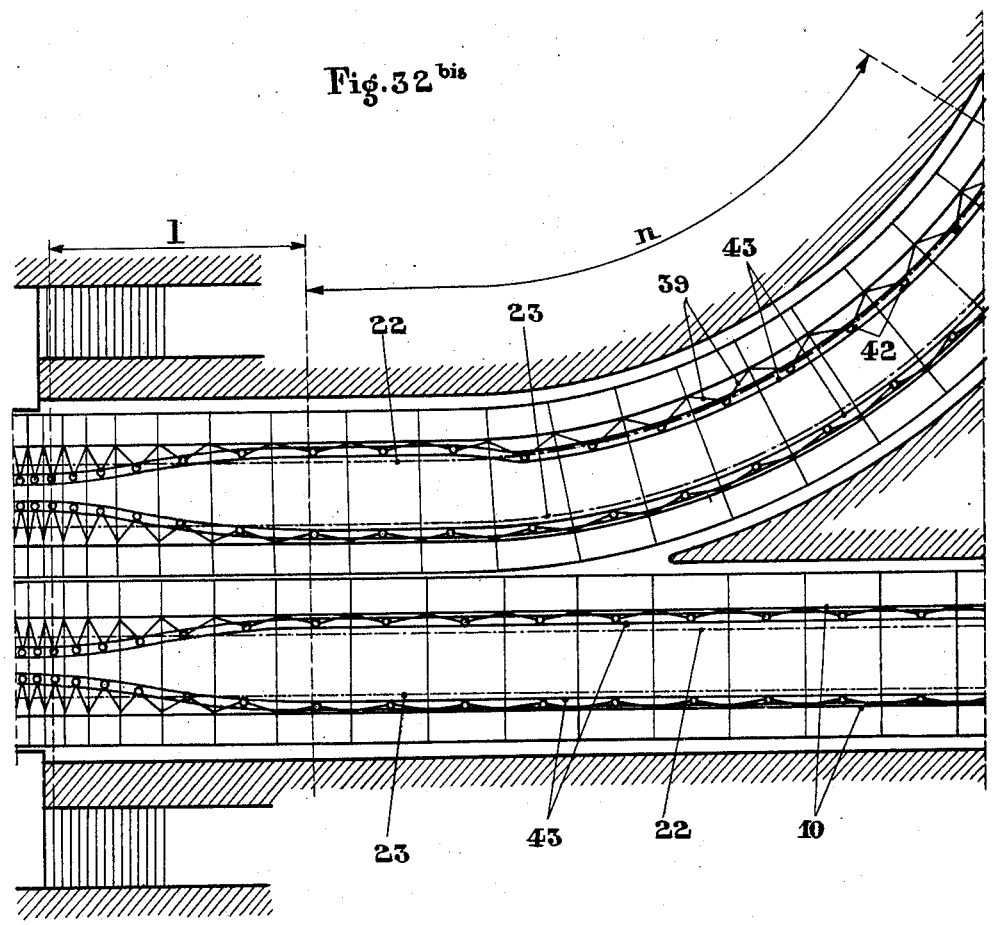

Patented June 18, 1929.

1,718,085

UNITED STATES PATENT OFFICE.

ROBERT SÉNÉ, OF PARIS, FRANCE.

MOVABLE PLATFORM.

Application filed June 27, 1928, Serial No. 288,793, and in France September 12, 1927.

The present invention has for its object a movable platform, intended for the conveyance of persons or goods and characterized by the fact that the carrying floor of the said platform, being formed of elastic elements suitably connected, is adapted to extend or shorten longitudinally so as to enable the said floor, in its travel past certain predetermined fixed points, to be given different linear speeds, proportional to the extension of the platform at these points, the platform, consisting of an endless belt, having an invariable total length.

Such a device, applied for example to the conveyance of persons, enables the platform to attain, between embarking and disembarking stations, a linear speed of the order of fifteen kilometres per hour which speed can be reduced to two kilometres per hour for the whole length of the station platforms; it will be seen that such a device permits the direct stepping of passengers onto the platform and likewise their direct disembarkation onto the platform of the station, without any intermediate speed member (footway or vehicle) being necessary.

The elasticity of the elements which form the platform is such that it permits the extension of the platform, not only uniformly in longitudinal direction, but also so that the extension of one side of the platform differs from that of the other; this feature enables the platform to follow curves of slight radius and in any direction, where the platform moves in one plane.

When the platform is moving after the fashion of a belt in superposed planes, the flexibility of the elements forming the platform is sufficient to enable them to exactly follow the end-curves which connect the different planes followed.

In the accompanying drawing:—

Figures 1 and 2 are plan views showing the construction of the elastic elements which form the platform.

Figures 3, 4, 5, 6 and 7 illustrate details of assembling the plates which form the platform.

Figure 8 is a plan view illustrative of the manner of coupling the various elastic elements which form the platform.

Figure 9 illustrates a method of assembling the rigid end bars of the elements.

Figures 10, 11, 12 and 13 show different methods of arranging the bearing apparatus of the moving platform.

Figure 14 illustrates a special method of actuating the moving platform.

Figures 15, 16, 17 and 18 are diagrammatic views of a longitudinal platform-supporting device.

Figure 19 shows another device for supporting the platform by means of a support connected to the cam follower.

Figures 20 and 21 show diagrammatically the means by which the platform is guided and held in alignment laterally.

Figures 22 and 23 show driving means for the moving platform.

Figures 24, 25 and 26 show the device controlling the extension and shortening of the elastic elements for the purpose of increasing or decreasing the speed of a section of the platform.

Figures 27 and 28 show a method of constructing a hand-rail applicable to the platform according to the invention.

Figure 29:
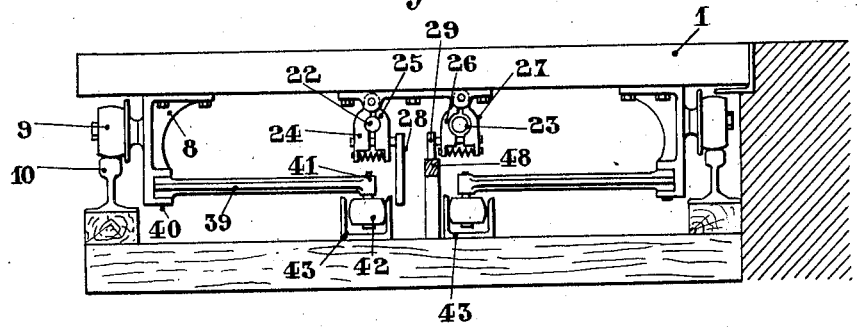
Figure 29 is a cross sectional view of the parts shown in Figure 30, of a platform constructed according to the invention and showing the bearing devices and device for drive and control of speed.

Finally Figures 33 and 34 show diagrammatically a method of producing a moving endless platform, moving in superposed planes, either at a variable or invariable speed.

A moving platform, constructed according to the present invention, consists of any number of elastic elements interconnected by rigid members, so as to form an endless platform, the said platform being supported by rollers, wheels, runners, or any analogous members, adapted to move on rails or on guides of suitable shape, the system being driven longitudinally by cables, chains, drums or other devices performing the same functions.

As will be seen from Figures 1 and 2, each of the elastic elements which enter into the construction of the platform is formed by two steel bars 1 between which are arranged steel plates 2 of very thin gauge (one half-millimetre, for example) and of variable height (fifteen to twenty millimetres, for example), these elements being connected in staggered formation in pairs by rivets 3 or by any other suitable means.

It will be seen that such an element is elastic in a longitudinal direction; in fact, according to the separation of the two consecutive bars 1 the elasticity of the plates 2 will permit of an extension or shortening of the element as a whole.

Figure 1 shows the position of the plates 2 when the element is extended; Figure 2 shows the position of the same plates when the element occupies its most shortened position.

The plates 2 which form the actual elastic platform may be inter-assembled in the manner shown in Figures 3, 4, and 5. The said plates being pierced at equal distances with holes 4 arranged vertically in one or more lines (two in the present instance) and the rivets 3, engaged in the holes 4, connecting adjacent plates.

The riveting must be effected in such a manner that the rivet heads are as flat as possible and do not prevent the closing up of the plates in the shortened position of the platform.

Figures 6 and 7 show the manner in which the assembly of the first plates onto the rigid bars of the element ends can be effected; the assembling can be effected by means of a screw 5, except at the end of the plates, which must retain a certain amount of play; in this case the holes 6 of the plates, in which the screws engage, will be made oval in the manner shown in Figure 7.

The rigid bars 1 forming the ends of each of the elements may be inter-connected so as to form a continuous platform, as shown in Figure 8; the said bars may be assembled in the manner shown in Figure 9; they may be pierced at intervals with holes of suitable diameter and inter-connected by bolts 7 engaging in these holes, machined in such a manner that the heads and nuts of the bolts 7 do not extend beyond the bars and thereby prevent the closing up of the first plates against these bars.

On its lower face each of the bars 1 carries supports 8 fixed thereto by any suitable means and on which are mounted wheels 9 adapted to roll on the rails 10 (Figures 10 and 11). These wheels may be of any diameter, according to the method of application desired; they may be externally fixed to the bars 1, as shown in Figures 10 and 11; they may also be fixed to the inside of these bars, i. e. so that the runway is, in plan, in the interior of the platform, as shown in Figure 12; the wheels may also be replaced by rollers 11 rolling inside the bridge rails 12, as shown in Figure 13. Generally speaking any rolling device may be adopted which is considered suitable, both as regards the shape of the rails or the rollers or as regards the type of rail; in certain cases the rotary members may even be replaced by runners or balls.

The rotary members of the rolling gear may also be stationary, instead of being integral with the platform itself; this method of construction is shown in Figure 14; in this case the rollers 13, mounted so as to turn on the fixed bearings 14, have a peripheral groove in which an actuating cable 15 of the platform can rest.

A platform, constructed in the manner above described and which is adapted to support varying weights, may have a tendency to sink under this weight and a sag of this description may be injurious to its good working and hinder its use; in order to avoid this disadvantage it will be necessary to provide both longitudinal and lateral supports for the purpose of resisting any deformations of the elastic part of the platform.

Such longitudinal supports may be formed in the manner shown in Figures 15, 16, 17 and 18.

On the cross bars 1 are fixed brackets 16 forming rakes and interengaging, when the element occupies the shortened position, between the brackets 17 of the adjacent bar 1; in its shortened position the elastic platform is thus perfectly and completely supported by the said brackets. When in consequence of the progressive increase in speed, the elastic platform extends, it continues to be completely supported longitudinally by the brackets 16 and 17 until it reaches the position shown in Figure 18, in which position the brackets in question are widely separated from each other, the central part of the platform is no longer supported; at this stage, however, a sagging of the platform section is much less likely owing to the tension of the plates, which imparts to each of the elements a certain rigidity. If necessary, however, the longitudinal support system may be completed by joining cam followers to the supports, to which cam followers reference will be made later, the travelling rollers 18 (Figure 19) moving on the rails 19 which follow the curvature of the cams, the platform resting in this case without intermediate means or any intermediate supporting means, on the jointed arms 39 of the accelerating device.

On the other hand, in order to complete the system of platform supports, the platform may rest on lateral guides 21, similar to those shown in Figures 20 and 21; these guides may consist of section iron fitted throughout the length of the route followed by the platform, their upper part being under the upper level of the platform, as shown in Figure 20, or they may be exactly on that level or again at a higher level, as shown in Figure 21.

The platform being thus constructed, adapted to travel and being suitably supported, the driving thereof may be effected as shown in Figure 22.

If it is assumed that the platform, the different members of which have now been described, is to be adapted for passenger transport and have two principal speeds,—one such speed being that which the platform has been passing between two successive stations, the second being that when passing through the said stations,—the actuating device may consist of two cables 22 and 23, the first for example moving at a constant speed of fifteen kilometres per hour, the second having a linear speed of three kilometres per hour.

To enable the appropriate speeds of the platform to be maintained, in and out of the stations, to working requirements, it will be necessary that the elements which comprise the said platform be connected with the cable 22, outside the stations and with the cable 23 during passage of these elements past the station platforms.

In order to obtain this result certain bars 1 will have a double set of jaws 24—25 and 26—27, adapted to clamp respectively on the cables 22 and 23, the opening or closing of the said jaws being determined, for example, by the rotation of levers 28 and 29 contacting with a thrust bearing or a special rail mounted on the underframe of the track, of suitable gauge. This device is more particularly applicable in the case where the platform moves substantially in the same plane.

If it is a question of a platform which moves in superposed planes, after the fashion of a transmission belt, the drive may be effected without cable, by auxiliary rolling platforms actuated at different speeds; thus as is shown in Figure 23, in case it is desired to actuate the platform, between the points $a$ and $b$, at a speed of fifteen kilometers per hour, and, between the points $c$ and $d$ and $e$ and $f$ at a speed of three kilometres per hour, there may be arranged under the platform, immediately between $a$ and $b$, an auxiliary platform 30 driven at a linear speed of fifteen kilometres per hour by the drums 31 and 32 and, immediately between $c$ and $d$ and $e$ and $f$, auxiliary platforms 33 and 34 respectively driven at a speed of three kilometres per hour by the drums 35—36 and 37—38.

Any intermediate mechanisms for drive or support, analogous or not to those described above, may be adjoined to this driving system.

It will be understood that it is impossible to suddenly change over the speed of the platform flooring from the minimum to the maximum speed and vice versa; the extension or the shortening of the platform must be effected without jerking, both for preventing damage to goods carried and for avoiding dangerous reactions for passengers or objects placed on the platform; it is therefore indispensable that between the two speeds the platform be adapted to assume progressively intermediate speeds and, naturally during this period, the platform should not be rigidly connected either to one cable or the other, or to the driving platform.

In order to obtain a progressive variation of the speed, in the case of slowing down before reaching a station and accelerating beyond the station (Figures 24, 25 and 26) the bars 1 are connected in pairs by means of a system of jointed arms 39. At one of their ends 40 the arms 39 are connected to the bars 1 and at their other ends 41 they are jointed to one another, the axis of articulation 41 of two adjacent arms carrying a roller 42 adapted to roll along a rail 43 forming a cam, the shape of the said cam being calculated so as to progressively reduce or increase the interval between two consecutive bars during the period of passage from one speed to another; in this manner a progressive variation of the speed is obtained, the contour of the cams 43 being moreover determined by experience, so as to ensure variations which correspond best to the physiological reaction of the passengers.

It will be understood that the speed variation control by means of cams will prevail throughout the whole length of the platform; that is to say, between two consecutive bars 1, there will in every case be an articulated system of arms 39, as shown in Figure 24, which shows in particular the passage from the slow speed at the point $g$ to the high speed at the point $h$, the direction of travel being indicated by the arrow $i$.

The cams 43 would be constituted either by a double rail 44—45, as shown in Figure 26, or by a single rail on the sides of which would rest two conjugated rollers mounted on the supporting arm 41, or by a single U-shaped rail in which travel rollers 42, the latter arrangement being shown in Figures 29, 30 and 31 hereinafter referred to.

In order to ensure the safety of passengers, one side of the platform floor can be provided with a flexible hand-rail similar to the flexible elements of the flooring; in this case (Figures 27 and 28) the vertical elements which constitute the said rail comprise uprights 46 fixed respectively on each of the bars 1 of the floor elements and interconnected by means of elastic belts 47 made in the same way as the elastic elements of the floor; in addition, in the high speed zones there are provided, at the side of the platform where there is no flexible hand-rail, handrails moving at the same speed as the platform, but independent thereof.

Figure 29 shows, in a more detailed way, the construction of the equipment of one of the bars 1 of a platform constructed according to the invention; it shows the running gear formed by the brackets 8, the wheel 9 running on the rails 10, the driving systems consisting of cables 22 and 23 and the jaws 24 and 25 and 26—27 adapted to be made integral with one or other of the cables by the rotation of the levers 28 and 29 encountering the rails 48; the same figure also shows the articulated system formed by the arms 39, the axes 40 and 41 and the rollers 42 running in the bridge (cam) rails 43, the said cam-rails consisting, in this case, of channel iron.

Figure 30:
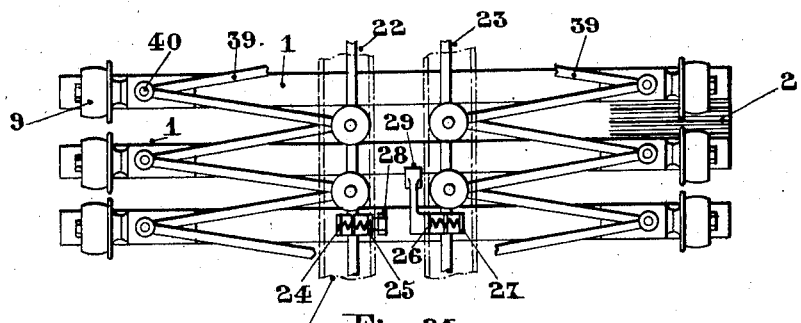
Figure 30 is a plan view from above of part of an element of the said platform, in the shortened state.
Figure 31:
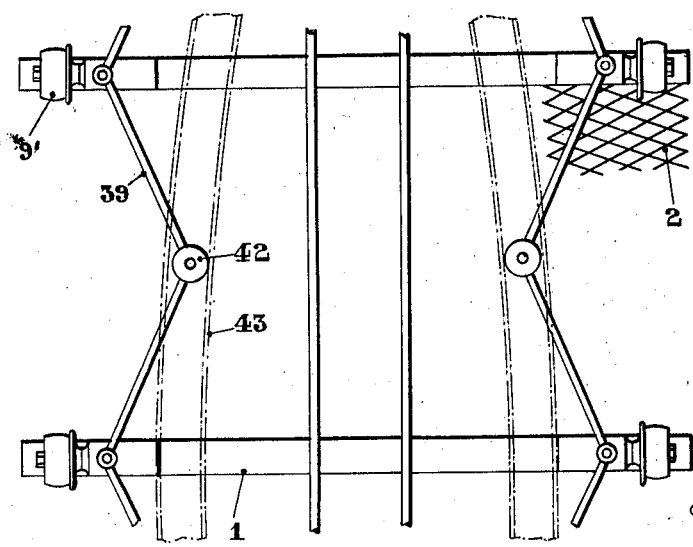
Figure 31 is a similar view of part of an element in the extended state.

Figures 30 and 31 show the platform equipment underneath the floor, Figure 30 having reference to the case in which the floor is in its most shortened position, Figure 31 having reference to the case in which the platform is most extended; there will be seen from these figures the various elements which have been described above and particularly the position assumed by the articulated arms 39 controlling the separation of the bars 1 for both positions of the platform.

Figure 32:
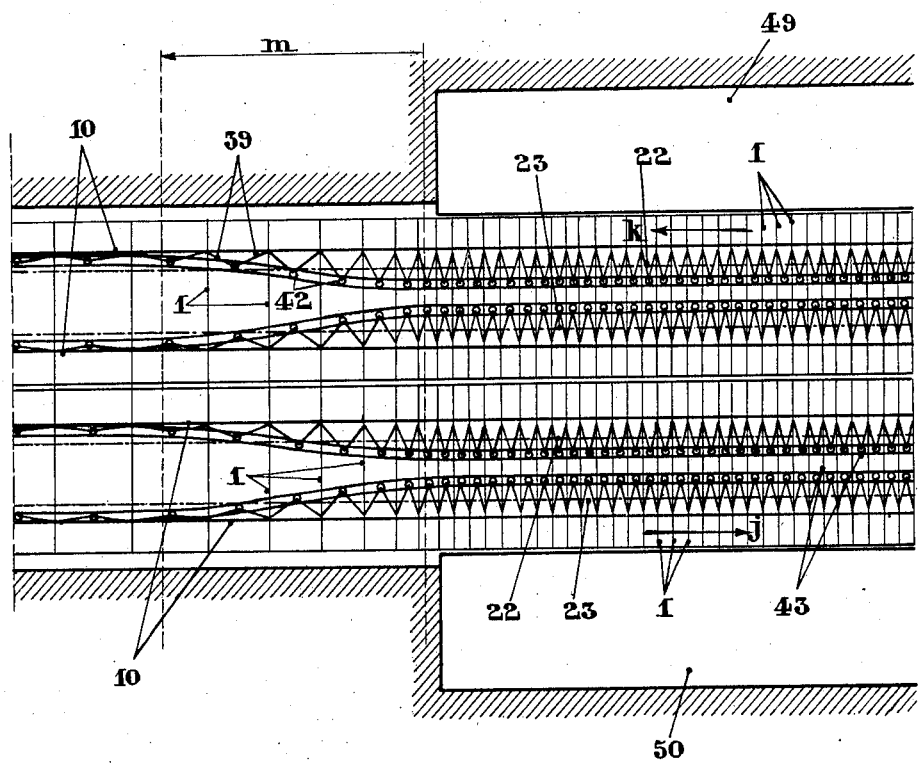
Figure 32 illustrates the method of arranging platforms for passenger service when passing through an embarking and disembarking station.

Figure 32 shows a plan view of the moving platforms in operation, constructed according to the invention, in front of the platforms 49 and 50 of a station, the system comprising two platforms, one moving in the direction of the arrow j and the other in the direction of the arrow k, the station in question being located near the extremity of a track comprising a connecting loop. This figure shows particularly the separation of the bars 1 at high speed and low speed of the platform as also the intermediate track sections m and l of acceleration and deceleration. The profile of the cams 43 is also shown as also are the positions assumed by the arms 39 for the different speeds of the platform.

It will be noticed that when the platform, instead of travelling in a straight line, follows a curve such as that shown at n in Figure 32$^b$, the bars 1 do not remain parallel; the result is that the sheets which form the floor are closer together at the side located towards the centre of the curve than at the outer side; it will be obvious that the elasticity of the elements permits these differences in separation, but they must be controlled by the articulated arms 39, under the action of the cams 43, and the latter must necessarily, to obtain this result, be carried, over a suitable distance, towards the outside of the curve; in other words, in this case the two cam rails 43 will no longer be at equal distances from the axis of the runway; this allowance can always be easily made.

As stated above, the platform may move substantially in one and the same plane or in superposed planes similar to a belt; the latter arrangement is shown in Figure 33 and, in this case, there may be adopted, as a means for driving and running, a device analogous to that described for the platform moving in one plane, or the driving device shown in Figure 23, the speed varying devices being the same; in addition, there may also be constructed, with a platform consisting of elastic elements, a system moving at a constant speed and in this case, as is shown in Figure 34, the bars 1 may be connected by braces 51 consisting of flexible cables which permit the winding of the platform on a drum of any suitable kind, when the said platform is intended to move in superposed planes.

It will be easily understood that a moving platform, consisting of elastic elements of the kind described above and furnished with devices for regulating the extension and shortening of the said elements, forms a means of transport, circulating at high speed, and adapted to slow down in stations, the intermediate speeds being obtained progressively and controlled at will.

A few dozen metres prior to passing the station platforms, the moving platform, which at the moment is travelling at high speed, is disconnected from the cable 22, the jaws 24 and 25 being separated from the said cable in consequence of the raising of the lever 28 on coming into contact with the high speed release rail; the elements involved are then not connected to either of the two cables 22 and 23 and the shortening of the elements is effected by the action of the rollers 42 which follow the cams 43 and close up the end bars of the elements; at that point of the track at which the shortening reaches it maximum, the low speed release rail 48 is discontinued, the lever 29 is lowered and the jaws 26 and 27 re-connect the platform with the low speed cable 23; the platform retains this speed until the end of the station platform, at which point the low speed release rail 48 again commences, the platform is again released and can increase its speed progressively until, under the action of the articulated system 39 controlled by the cams 43, it has attained the speed of the cable 22; at this moment, the high speed release rail is discontinued, the jaws clasp the cable 22 and the platform is drawn along at the speed of this cable.

The floor of the platform consisting, as already stated, of elastic metallic sheets, is very smooth and permits a good foothold; the maximum separation of the sheets one from the other should not exceed about two centimetres; even in the event of some object, such for example as the point of an umbrella, becoming caught between two sheets, owing to the elasticity of the system no damage would result, either to the object itself or the floor.

It will be understood that the flooring of the moving platform according to the invention, consisting of metallic elastic elements, may be applied to any system of moving platform or transporter other than that which has been described, that the speed of the platform may be constant or variable, that the movement may be effected in one single plane or in several planes, horizontal or inclined, connected by suitable curves and that the said platform may be adapted to the transport of goods as well as to that of passengers.

It will also be understood that the running, driving and guiding, suspension and speed regulating gears which have been described have only been referred to by way of example, as also the nature, position and shape of the members forming these devices, and that either of same may be constructed in another way or be modified according to necessity as shown by experience, without these different constructions or modifications exceeding the scope of the invention.

What I claim and desire to secure by Letters Patent is:—

1. A movable platform comprising a plurality of elastic elements mechanically connected in series, each element comprising articulated elastic members bounded by rigid bars extending transversely to the longitudinal axis of the platform.

2. A movable platform comprising a plurality of elastic elements mechanically connected in series, each element comprising rigid bars extending transversely to the longitudinal axis of the platform and intervening elastic strips interconnected latticewise.

3. A movable platform comprising a plurality of elastic elements mechanically connected in series, each element comprising rigid bars extending transversely to the longitudinal axis of the platform, intervening steel strips and staggered strip-interconnecting rivets.

4. A travelling platform comprising a plurality of elastic elements mechanically connected in series, means for elongating said elements in succession as they traverse a certain section of the track, and means for shortening said elements in succession as they traverse another section of the track.

5. A travelling platform comprising a plurality of elastic elements mechanically connected in series, means for conveying said platform at different speeds along a track, and automatic means whereby the platform determines its speed over different portions of the track.

6. A travelling platform comprising a plurality of elastic elements mechanically connected in series, high speed track travelling means, low speed track travelling means, means for connecting the platform selectively to said high or low speed track travelling means, and means for adapting said platform to changes of speed consequent upon connection to said track-travelling means; said speed change adapting means comprising platform element elongating and shortening means.

7. An endless track travelling platform comprising a plurality of elastic sections mechanically connected in series and each composed of rigid transverse boundary bars and latticewise interconnected elastic strips, separate high and low speed track travelling means, selective interconnecting means between said platform and said high and low speed track travelling means, means for elongating the platform sections in succession as they traverse a portion of the track, means for shortening the platform sections in succession as they traverse another portion of the track.

8. An endless track travelling platform comprising a plurality of elastic sections mechanically connected in series and each composed of rigid transverse boundary bars and latticewise interconnected elastic strips, separate high and low speed track travelling means, means for connecting and disconnecting the platform with the high speed track travelling means and with the low speed track travelling means selectively, means for elongating the track sections after disconnection with the low speed track travelling means and before connection with the high speed track travelling means, and means for shortening the track sections after disconnection with the high speed track travelling means and before connection with the low speed track travelling means.

9. An endless track travelling platform as claimed in claim 8, including means for supporting the elastic strips where they extend between their rigid transverse boundary bars.

10. An endless track travelling platform as claimed in claim 8, including interfitting comb-like means extending from the rigid transverse boundary bars of the platform sections to points beneath the intervening elastic strips of said sections.

11. An endless track travelling platform as claimed in claim 8, including a hand rail for passengers.

12. An endless track travelling platform as claimed in claim 8, including a hand rail which travels at different speeds over different portions of the track in synchronism with the travel of adjacent platform sections.

13. A travelling platform composed of longitudinally extensible and contractible sections mechanically connected in series, means for conveying said platform at high speed, means for conveying said platform at low speed, means for extending said sections during the interval in changing from low to high speed platform travel, and means for contracting said sections during the interval in changing from high to low speed platform travel.

14. A travelling platform longitudinally extensible and contractible lengthwise, means for connecting and disconnecting it with either of a plurality of track travelling means travelling at different speeds, means for accelerating track sections locally during travel after connection with low speed track travelling means but before connection with higher speed track travelling means, and means for decelerating track sections locally during travel after connection with high speed track travelling means but before connection with lower speed track travelling means.

In testimony whereof I have signed my name to this specification.

ROBERT SÉNÉ.